3,629,241
TEXTILE OPTICAL BRIGHTENERS
Horst-Jurgen Krause and Manfred Dohr, Dusseldorf-Holthausen, Germany, assignors to Henkel & Cie G.m.b.H., Dusseldorf, Germany
No Drawing. Filed June 26, 1969, Ser. No. 836,959
Claims priority, application Germany, July 2, 1968, P 17 70 773.2
Int. Cl. C07d 49/10
U.S. Cl. 260—239.9     4 Claims

ABSTRACT OF THE DISCLOSURE

An optical brightener for textiles having the formula

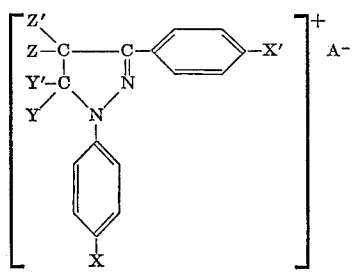

wherein

X is $-SO_2NH_2$, $-SO_2R$, $-SO_2-OR$, $-COOR$, $-CONH_2$, $-CN$, $-CF_3$, halogen, $-OR$, or $-R$;
X' is halogen, $-OR$ or $-R$;
Y is

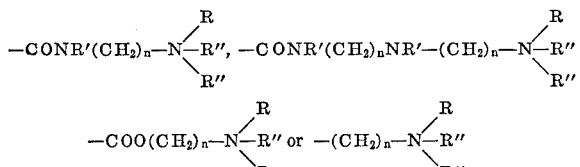

Y' is H, $-R$ or phenyl;
Z is H or Y;
Z' is H or R;
R is alkyl having 1 to 4 carbon atoms;
R' is H or R;
R'' is R or $-(CH_2)_{n-1}-CH_2OH$;
n is an integer from 2 to 4; and
A⁻ is an anion of an acid.

THE PRIOR ART

Optical brighteners from the class of 1,3-diarylpyrazoline compounds are known which are suitable for the optical brightening of wool and synthetic fibers, especially polyamide fibers. A disadvantage of these brightening agents, however, is that they are only relatively poorly absorbed on fibers consisting of chemically modified, or cross-linked cellulose, or on mixed fabrics from polymer fibers and cellulose and, therefore, only effect a small improvement of the whiteness value. When the known brighteners of the bis(triazinyl)-stilbenedisulfonic acid type are used for brightening such a fibrous material or the textiles made therefrom, it is found that when the washed textiles are subsequently treated with a cationic softening agent, the fluorescence is more or less extinguished. In many cases, however, such an after-treatment is desirable, especially for domestic washing, in order to give the textiles a pleasant soft handle.

OBJECTS OF THE INVENTION

An object of the present invention is the obtaining of an optical brightener for textiles having the formula

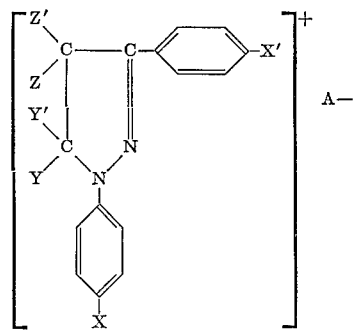

wherein

X is $-SO_2NH_2$, $-SO_2R$, $-SO_2-OR$, $-COOR$, $CONH_2$, $-CN$, $-CF_3$, halogen, $-OR$, or $-R$;
X' is halogen, $-OR$ or $-R$;
Y is

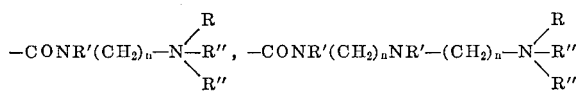

Y' is H, $-R$ or phenyl;
Z is H or Y;
Z' is H or R
R is alkyl having 1 to 4 carbon atoms;
R' is H or R;
R'' is R or $-(CH_2)_{n-1}-CH_2OH$;
n is an integer from 2 to 4; and
A⁻ is an anion of an acid.

Another object of the present invention is the development of a process for the production of the above optical brightener for textiles.

These and other objects of the present invention will become more apparent as the description thereof proceeds.

DESCRIPTION OF THE INVENTION

These objects have been achieved and the drawbacks of the prior art overcome by the discovery of novel optical brighteners of Formula I

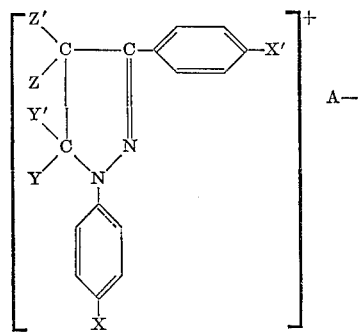

I wherein

X is —SO₂NH, —SO₂R, —SO₂—OR, —COOR, —CONH₂, —CN, —CF₃, halogen, —OR, or —R;
X' is halogen, —OR or —R;
Y is

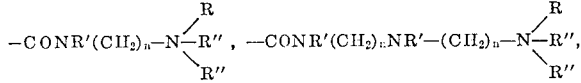

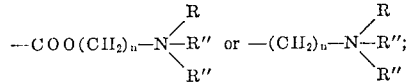

Y' is H, —R or phenyl;
Z is H or Y;
Z' is H or R;
R is alkyl having 1 to 4 carbon atoms;
R' is H or R;
R" is R or —(CH₂)$_{n-1}$—CH₂OH;
n is an integer from 2 to 4; and
A⁻ is an anion of an acid.

Preferred optical brighteners are those of Formula I and especially those of Formula II

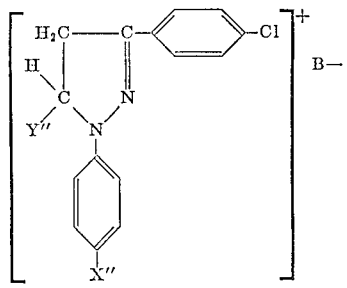

II wherein

X" represents —SO₂NH₂, —COOR''' or —CONH₂;
Y" represents

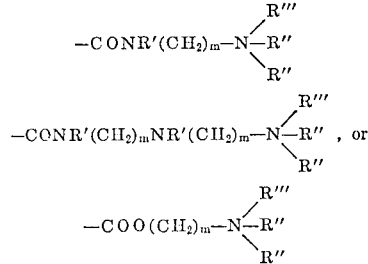

R''' represents an alkyl residue with 1 to 3 carbon atoms;
R' represents H or R''';
R" represents R''' or (CH₂)$_{m-1}$—CH₂OH;
m is 2 or 3;
B⁻ is a halide, acetate or alkylsulfate ion or the equivalent of a polyvalent acid, for example, sulfuric, phosphoric, oxalic and citric acids.

For the preparation of the 1,3-Δ²-diarylpyrazolines substituted in the 4 and/or 5 positions with quaternary ammonium groups, the preparation of the corresponding tertiary amines is first necessary, which can be converted into the quaternary ammonium salts by the usual methods.

For the preparation of the diaryl-Δ²-pyrazolines substituted with tertiary amino groups in the 4 and/or 5 positions, the reaction of compounds of the Formula III

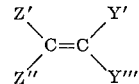

III wherein

Z', as above, represents H or R;
R being an alkyl of 1 to 4 carbon atoms;

Y', as above, represents H, R or phenyl;
Z" represents H or Y''', and
Y''' represents

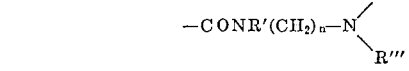

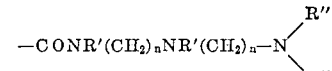

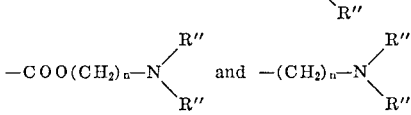

R' being H or R,
R" being R or —(CH₂)$_{n-1}$—CH₂OH, and
n being an integer from 2 to 4, such as derivatives of acrylic, fumaric or maleic acid containing tertiary amino groups with substituted α-halobenzaldehyde phenylhydrazones of the Formula IV

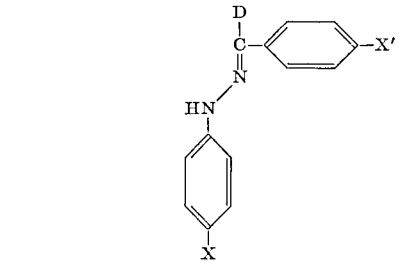

IV wherein

X and X' have the above-assigned values, and
D represents a halogen, is especially suitable. Suitable derivatives of acrylic acid are for example, compounds of Formula III, wherein Z', Z" and Y' are hydrogen, and Y''' is

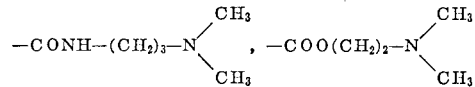

or

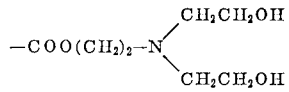

such as the amides and esters of the following formulae:

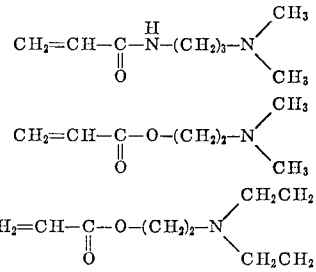

In addition, of course, comparable derivatives of methacrylic acid, where Y' is CH₃, atropic acid, where Y' is phenyl, β-ethylacrylic acid, where Z' is ethyl, and α,β-dimethylacrylic acid, where Y' and Z' are methyl, may also be utilized. Suitable derivatives of fumaric and maleic acid are, for example, compounds of Formula III, where Z' and Y' are hydrogen,
Z"=Y''', and
Y''' is

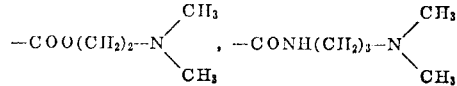

or

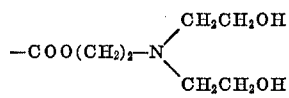

such as the amides and esters of the following formulae:

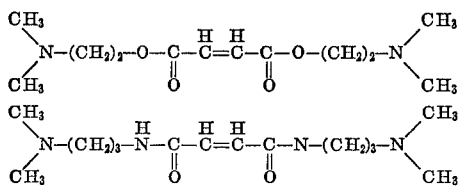

and

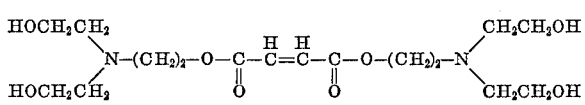

Further, the amides of acrylic, fumaric or maleic acids of diethylenetriamine, its methylation products or its subsequently methylated products, or the corresponding esters with triethanolamine, tripropanolamine and N-hydroxyethyl-N,N',N'-trimethyl-ethylenediamine may be used as starting substances.

The reaction of the aforesaid amides and esters with the substituted α-halobenzaldehyde-phenylhydrazones of Formula IV proceeds smoothly in the presence of an acid acceptor in the direction of a 1,3-dipolar cyclo-addition, the hydrazone derivative being first rearranged into a diphenyl-nitrilimine. Suitable acid acceptors are, for example, aliphatic or cycloaliphatic primary, secondary and, particularly, tertiary amines, such as trialkylamines, or carbonates, bicarbonates or hydroxides of alkali metals or alkaline earth metals.

The substituted α-halo benzaldehyde-phenylhydrazone of Formula IV is obtainable in known way from the corresponding benzoyl-phenylhydrazine by halogenation, for example, with phosphorus pentachloride.

The substituted benzoyl-phenylhydrazine is prepared in the known manner. Such substituted benzoyl-phenylhydrazines have the Formula V

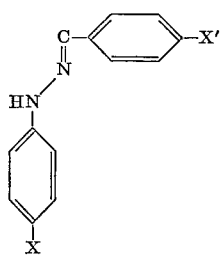

where X' and X have the above-identified values. Among these compounds are, for example p-chlorobenzoyl-p-sulfamylphenyl-hydrazine, where X=Cl and X'=—SO$_2$NH$_2$; p - methoxybenzoyl - p - sulfonylethoxyphenyl-hydrazine, where X=OCH$_3$ and X'=—SO$_2$—OC$_2$H$_5$; p-ethylbenzoyl-p-carbethoxyphenyl-hydrazine, where X=C$_2$H$_5$ and X'=COOC$_2$H$_5$; p-bromobenzoyl-p-carbamidophenyl-hydrazine, where X=Br and X'=CONH$_2$; p-chlorobenzaldehyde-p-chlorophenyl-hydrazine, where X=X'=Cl; p-chlorobenzoyl-p-methoxyphenyl-hydrazine, where X=Cl X'=OCH$_3$; p - chlorobenzoyl - p-cyanophenyl-hydrazine, where X=Cl and X'=CN; p-methylbenzoyl-p-trifluoromethylphenyl-hydrazine, where X=CH$_3$ and X'=CF$_3$; p-chlorobenzoyl-p-methylphenyl-hydrazine, where X=Cl and X'=CH$_3$; p-methoxybenzoyl-p-methyl-sulfonylphenyl-hydrazine, where X=OCH$_3$ and X'=SO$_2$CH$_3$.

The flow diagram for the reaction is given below.

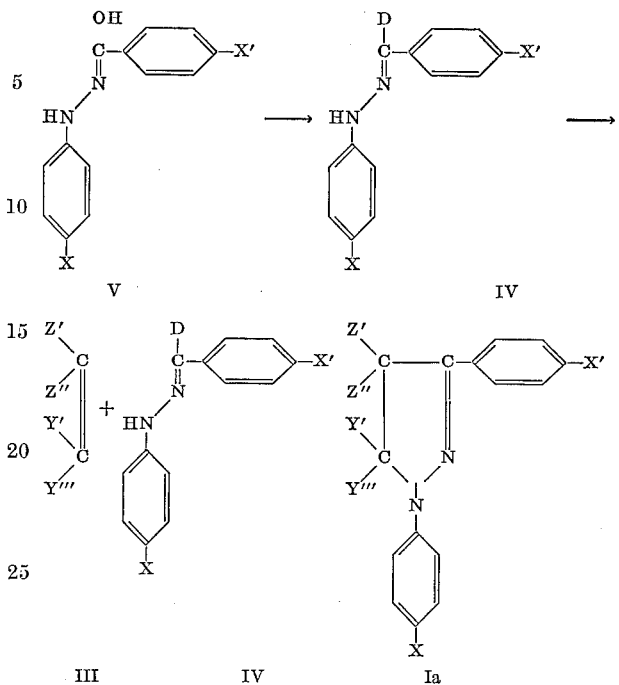

where the symbols Z' and Y''' correspond to the groups Z and Y, but contrary to these contain no quaternary nitrogen atoms.

The reaction of the amide or ester of Formula III with the halogenated hydrazone of Formula IV is suitably carried out with heat in the presence of a solvent, tetrahydrofuran having proved particularly good.

The substituted diarylpyrazoline can subsequently be converted into the quaternary compound in known way, the usual agents for this purpose being used, such as alkyl halides, dialkyl sulfates or alkyl chlorohydrins, the alkyl residues which contain 1 to 4, preferably 1 to 3, carbon atoms.

The optical brighteners according to the invention are suitable for brightening textiles and other structures containing cellulose, regenerated cellulose and synthetic fibers, and especially those of finished or cross-linked cellulose, and mixed fabrics of cellulose and polypropylene fibers. For the last-named types of fiber, a suitable brightening agent has not previously been known. The brighteners may also be used alone or in conjunction with textile washing agents.

The fact that the textiles treated with the brighteners of the invention or washed with a washing agent containing these brighteners can be subsequently rinsed with a usual cationic softening agent without the whiteness value being thereby reduced is of special importance.

The following example is illustrative of the invention without being limitative in any manner.

EXAMPLE 21.8 gm. (0.125 mol) of p-chlorobenzoyl chloride were dropped into a solution, cooled to +1° C., of 46.8 gm. (0.25 mol) of phenylhydrazine-(4)-sulfonic acid-amide in 250 ml. of anhydrous dimethyl formamide, with stirring and cooling using an ice bath. The mixture was then stirred at +2° C. for a further ¾ of an hour and, after removal of the ice bath, was stirred at room temperature for a further 3 hours.

After distilling off the solvent in vacuum, the crystalline slurry was taken up in 500 ml. of water to remove the phenylhydrazine-(4)-sulfonic acid-amide hydrochloride, and the insoluble p-chloro-β-benzoyl-phenylhydrazine-sulfonic acid amide was filtered off by suction, washed twice with cold water and, after drying, recrystallized twice from about 3.5 liters of ethanol. The product had a melting point of 267° C.

34.1 gm. (0.105 mol) of the finely powdered p-chloro-β-benzoyl-phenylhydrazine-sulfonic acid amide and 26.6 gm. (0.128 mol) of phosphorus pentachloride were boiled in 400 ml. of anhydrous methylene chloride with exclusion of moisture for 22 hours under reflux with stirring. Then 42.6 gm. of phenol were introduced into the suspension while stirring. A copious evolution of hydrogen chloride took place and a clear solution was temporarily formed which soon became cloudy with separation of crystals. After crystallization on an ice bath, the crystals were filtered off by suction and washed twice with cold methylene chloride. After recrystallizing from acetone with addition of water, 1-p-chlorobenzyl-(2-p-sulfoamidophenylhydrazine)-chloride was obtained in the form of colorless crystals having a melting point of 218° C. to 219° C.

27.6 gm. (0.08 mol) of the said compound 37.4 gm. (0.24 mol) of acrylic acid-dimethylaminopropylamide, stabilized with 1 gm. of hydroquinone, in 280 ml. of anhydrous tetrahydrofuran were treated dropwise with 16.0 gm. (0.16 mol) of triethylamine. After boiling under reflux for one hour, the solution was cooled and, after filtering off the triethylammonium chloride, was evaporated in vacuo. The residue was then taken up in hot acetone and treated with water until it became cloudy. The crystals of 1 - p - sulfoamidophenyl - 3-p-chlorophenyl-Δ²-pyrazolinecarboxylic acid-(5)-N-dimethylamino-propylamide, precipitated in the cold, were recrystallized twice from ethanol. 6.8 gm. (0.0147 mol) of this compound were dissolved in 100 ml. of methanol and treated with 9.4 gm. (0.074 mol), equal to 7.2 ml., of dimethyl sulfate. This solution was heated at 40° C. with stirring for 3½ hours. The resulting solution was then cooled in an ice bath and the precipitated crystals were filtered off by suction and washed with a little methanol. After recrystallizing twice from methanol, 1-p-sulfonamidophenyl-3-p-chlorophenyl-Δ²-pyrazolinecarboxylic acid-(5) - N-trimethylammonium-propylamide methosulfate was obtained in the form of colorless crystals having a melting point of 177° C. in a yield of 7.8 gm.

Washed articles of cotton, viscose-rayon and acetate rayon, and cotton finished with synthetic resin or crosslinked, as well as a mixed fabric of cotton and polypropylene fiber (registered trademark "Meraklon"), when treated with this brightener had a pure white appearance.

The preceding specific embodiments are illustrative of the practice of the invention. It is to be understood, however, that other expedients known to those skilled in the art may be employed without departing from the scope of the claims.

We claim:

1. An optical brightener for textiles having the formula

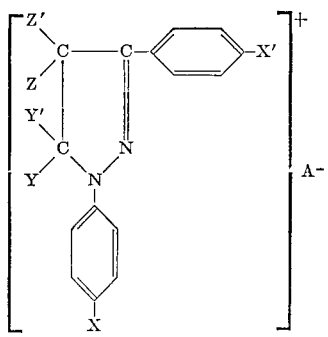

wherein

X is a member selected from the group consisting of —SO$_2$NH$_2$, —SO$_2$R, —SO$_2$—OR, —COOR, —CONH$_2$, —CN, —CF$_3$, halogen, —OR, and R;

X' is a member selected from the group consisting of halogen, —OR and —R;

Y is a member selected from the group consisting of

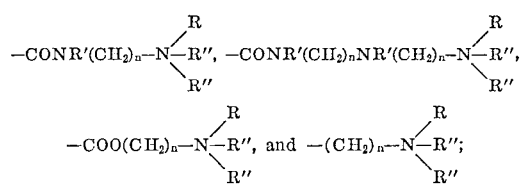

Y' is a member selected from the group consisting of H, —R and phenyl;

Z is a member selected from the group consisting of H and Y;

Z' is a member selected from the group consisting of H and R;

R is alkyl having 1 to 4 carbon atoms;

R' is a member selected from the group consisting of H and R;

R" is a member selected from the group consisting of R and —(CH$_2$)$_{n-1}$—CH$_2$OH;

n is an integer from 2 to 4; and

A⁻ is an anion of an acid.

2. An optical brightener for textiles of claim 1 having the formula

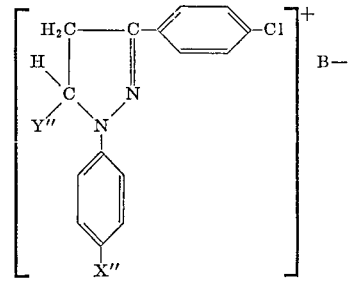

wherein

X" is a member selected from the group consisting of —SO$_2$NH$_2$, —COOR''' and —CONH$_2$;

Y" is a member selected from the group consisting of

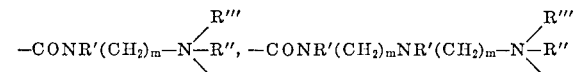

and 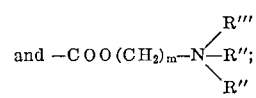

R''' is alkyl having 1 to 3 carbon atoms;

R' is a member selected from the group consisting of H and R''';

R" is a member selected from the group consisting of R''' and —(CH$_2$)$_{m-1}$—CH$_2$OH;

m is an integer from 2 to 3; and

B⁻ is an anion of an acid selected from the group consisting of a hydrogen halide, acetic acid, sulfuric acid, phosphoric acid, oxalic acid, citric acid and the acid alkylsulfuric acid wherein said alkyl had 1 to 4 carbon atoms.
3. An optical brightener for textiles of claim 2 wherein X″ is —SO$_2$NH$_2$.
4. An optical brightener for textiles of claim 3 wherein Y″ is
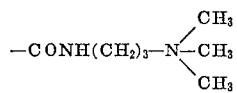
and B⁻ is the methosulfate ion.
References Cited
UNITED STATES PATENTS
3,141,879  1/1964  Hausermann et al. ___ 260—247.2
HENRY R. JILES, Primary Examiner
C. M. SHURKO, Assistant Examiner
U.S. Cl. X.R.
117—33.5; 260—310 D